L. W. BATES.
DREDGING PIPE JOINT.
APPLICATION FILED MAR. 22, 1900.
922,075.
Patented May 18, 1909.
2 SHEETS—SHEET 2.
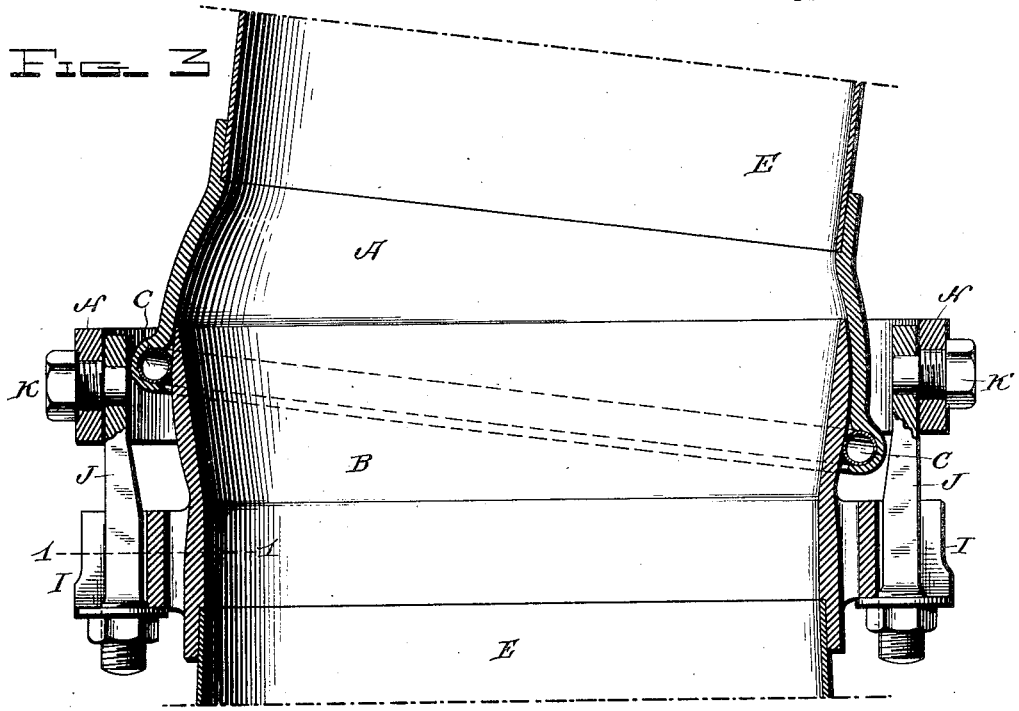
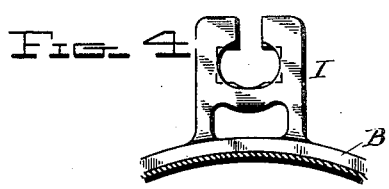
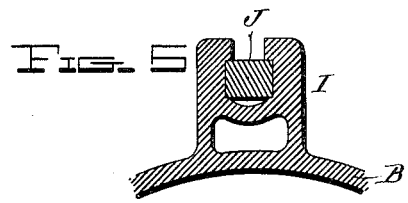
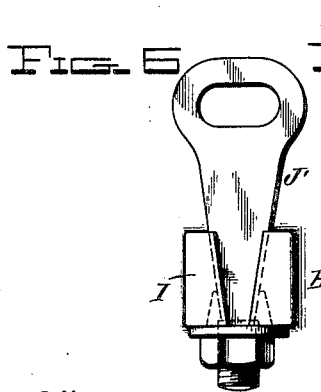
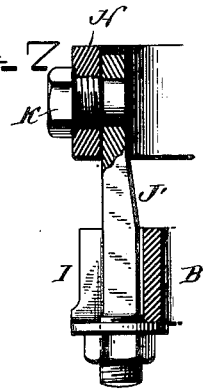
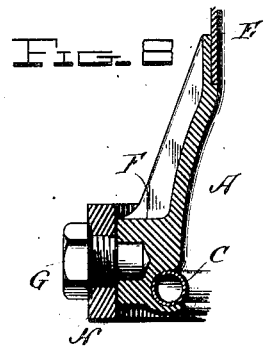
Witnesses
Inventor:
Lindon W. Bates,
by Dodge and Sons,
Attorneys.

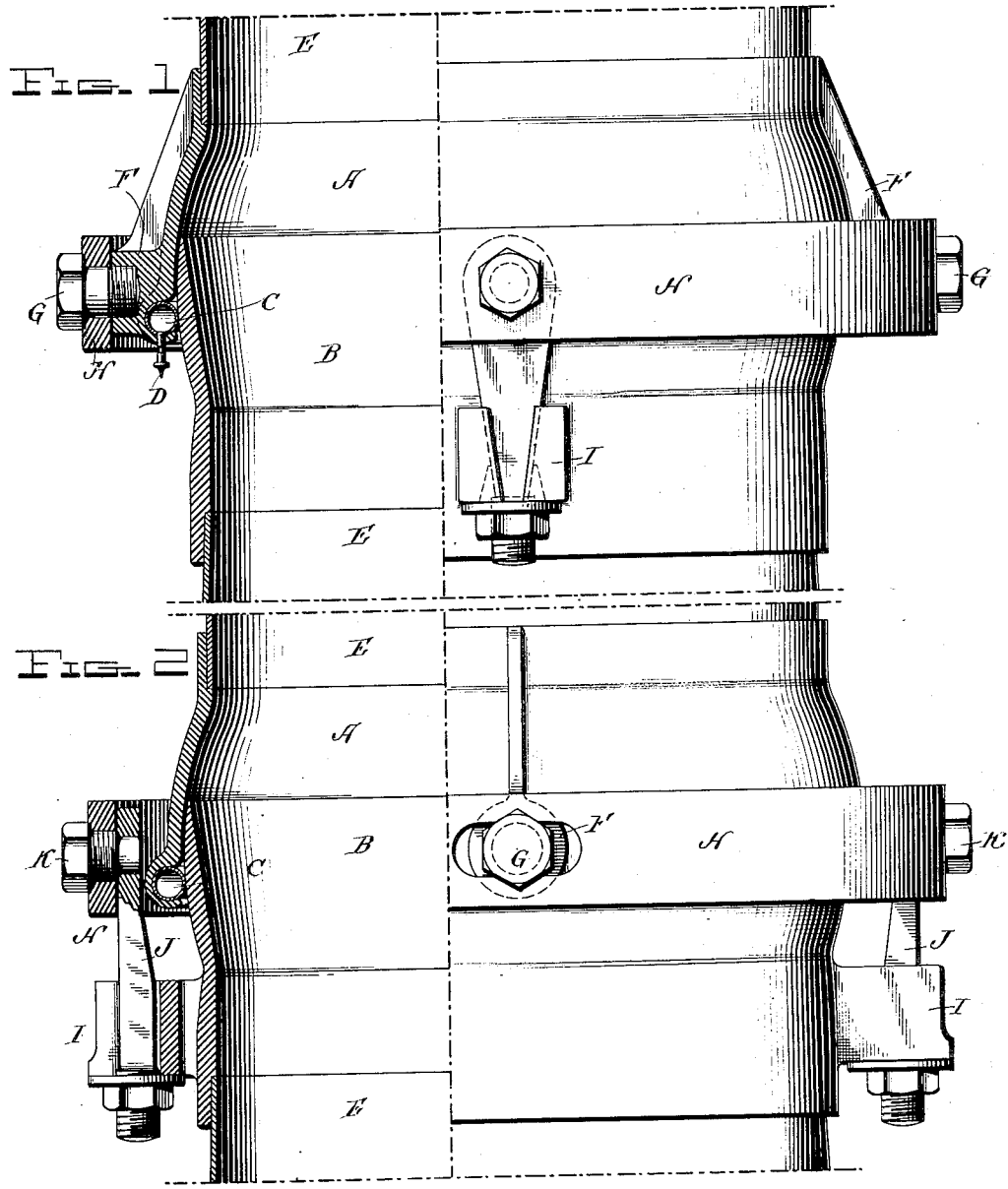

UNITED STATES PATENT OFFICE.

LINDON W. BATES, OF CHICAGO, ILLINOIS.

DREDGING-PIPE JOINT.

No. 922,075.

Specification of Letters Patent.

Patented May 18, 1909.

Application filed March 22, 1900. Serial No. 9,790.

*To all whom it may concern:*

Be it known that I, LINDON W. BATES, a citizen of the United States, residing at Chicago, in the county of Cook and State of Illinois, have invented certain new and useful Improvements in Dredging-Pipe Joints, of which the following is a specification.

My present invention pertains to improvements in joints for pipes for dredgers and the like, the advantages and construction of which will be hereinafter set forth, reference being had to the accompanying drawings wherein,—

Figure 1 is a side elevation, partly in section, of the improved joint; Fig. 2, a similar view looking at the joint from a different point of view, or at right angles to Fig. 1; Fig. 3, a longitudinal sectional view showing the relation of the parts when one is moved relatively to the other; Fig. 4, a bottom plan view of one of the lugs or brackets; Fig. 5, a transverse sectional view on the line 1—1 of Fig. 3, and Figs. 6, 7 and 8, detail views showing a modified form of certain features of the invention.

The object of my present invention is to provide a combined universal ball and socket joint for dredger discharge pipes, wherein great latitude of movement is secured, as well as a pipe possessing an interior practically free from all sharp abutments or angles.

Referring to the accompanying drawings, A indicates one member of the ball and socket joint, which may be termed the socket piece, and B denotes a corresponding member which is termed the ball. As will be seen more particularly upon reference to Fig. 3, the interior curved portion of the member A is formed upon a circle of a slightly larger radius than the outer curved face of the member B, so that the member B is free to turn or move within the curved portion of the member A and yet form a practically closed joint therewith.

To prevent leakage between the parts, fibrous packing or preferably a packing tube C is seated within a groove or channel formed at the mouth of the socket or bell-shaped member A, said tube being inflated through a valve D in order to make a tight joint with the outer curved face of the ball member B. As will be noted upon reference to Figs. 1, 2 and 3 the location or position of the packing ring with respect to the center line of the section B is such as to obtain a maximum angular deviation with a minimum diameter of sphere.

Each of the sections A and B is, of course, connected with a section or length of pipe E, as is usual.

To maintain the parts against longitudinal separation and yet to permit a universal movement, certain devices are employed which will now be described.

The upper or socket section A is, as will be noted upon reference to Figs. 1 and 2, provided with two oppositely-disposed lugs or bosses F preferably formed integral with the section. These bosses are tapped out and are designed to receive bolts or screws G which pass freely through openings in a ring or member H, said ring or member extending around the sections at a slight distance therefrom, and bearing only against the faces of the lugs F.

Extending out from the lower member B are two brackets I, said brackets standing at right angles to the lugs F of the upper section, or, in other words, being formed on a diameter which is at right angles to the diameter which would pass through the lugs F. Brackets I, as will be noted more particularly upon reference to Figs. 1, 4 and 5, are provided with a rectangular slot or recess which passes therethrough, and which is designed to receive the lower ends of the wedge-shaped members J. These members, or wedge arms as they may be termed, are held within the brackets by nuts screwed upon the lower ends thereof, as is best illustrated in Figs. 1 and 3. The members or arms J are provided at their upper ends with openings into which project the rounded portion of the ends of bolts or screws K which, as will be seen in Figs. 2 and 3, are screwed through the ring H. Thus the ring will be free to turn with the upper section A with the ends of the bolts or screws K acting as pivots.

Movement of section A in a reverse direction, or in a direction at right angles to that just described, will take place by reason of the section A turning with the bolts or screws G in the member H. This position is illustrated in Fig. 3. Of course, if the member A and its attached pipe are held against movement, then member B with the arms J and the ring secured thereto, will be moved about the screws or bolts G and the same result accomplished. It will of course be seen that any movement intermediate the two just described will take place with a general movement of the parts; that is to say, the ring swinging on the bolts or screws J, and the upper section A swinging independently of the ring or turning in the ring as above noted.

The parts are readily assembled.

By slacking the nuts on the arms or members J they may be drawn out and may also perform a slight lateral movement, so that the coupling up of the various sections may be conveniently performed in case the two halves of the joint should not come fairly opposite each other. Upon reference to Fig. 2 it will be noted that the opening in the ring or member H, through which the bolt or screw G passes, is made oblong so that there may be a slight degree of torsional movement of the parts. This not only facilitates the coupling up of the members, but is also of service in preventing the parts from being unduly strained when in use.

In Figs. 6, 7 and 8 there is shown a slightly modified form of construction, wherein the wedge blocks or members J', corresponding to the members J of the construction above set forth, are provided with an oblong slot or opening which permits of the torsional movement just referred to. The screws or bolts which pass through the ring and into the lug of the upper member are, in this instance, as shown in Fig. 8, screwed into the ring, with the inner end of the bolt made cylindrical and fitting within and free to turn in a socket formed in the lugs upon the upper section.

It will be noted with this construction that the four bolts or screws which go to connect the parts together are all made secure to the ring, whereas in the construction shown in Figs. 1 to 5 inclusive, but one pair of screws, namely those connecting the ring and the wedge-shaped arms J, are secured to the ring, the ring being free to turn upon the oppositely-disposed bolts or screws G.

It is to be noted that in the construction above described the ball and socket surfaces do not necessarily touch, and that resistance to longitudinal motion is offered not by these members but by the encircling members and pivots.

The brackets I and the members or arms J and J' may be termed a yoke.

It is immaterial whether the bolts or screws G are threaded into the members F and are loose upon the ring, as shown in Fig. 1, or whether the screws, as K, are threaded in the ring and have their loose bearing in the ends of the arms or yokes, as shown in Figs. 2 and 3. A reversal of this arrangement, of course, falls within the scope of my invention, and is a mere mechanical change, not involving invention. It is likewise immaterial whether or not the ring be of such size as to pass within the arms of the yoke, and the trunnions extend outwardly therefrom, or the ring be made of a size to pass outside of the arms of the yoke and the trunnions extend inwardly therefrom and are pivotally mounted in the yoke.

From a mere inspection of the drawings it will be noted that the axis of the trunnions of the ring substantially includes the center of the ball-section B.

Having thus described my invention, what I claim is:

1. In a joint for suction or discharge pipes for dredgers and the like, the combination of a socket section A carrying a packing at its outer end; a ball section working within said socket section and over the packing; and means extraneous of said ball and socket sections for holding said parts against longitudinal separation, permitting a universal movement of one within the other and preventing longitudinal strain of resistance from being applied to the ball and socket sections, substantially as described.

2. In a joint for suction or discharge pipes for dredgers and the like, the combination of a socket section A; a packing carried at the outer end thereof; a ball section B working within said socket section A and over the packing; a ring H encircling said parts at a slight distance therefrom; and connections intermediate said ring and said sections, substantially as described, whereby the parts are held against longitudinal separation and a universal movement thereof is permitted.

3. In a joint for suction or discharge pipes for dredgers and the like, the combination of a socket section A provided with a packing at its outer end; a section B working within said socket section and over the packing; a ring H encircling said parts; a pivotal connection between said ring and the section A; brackets extending out from said section B; and connections between said brackets and the ring, said connections being at a point at right angles to the point of connection between the ring and the section A.

4. In a joint for suction or discharge pipes for dredgers and the like, the combination of a socket section A provided with a packing at its outer end; a ball section B working therein and over the packing; a ring H encircling said parts; a pivotal connection between said ring and said section A; brackets extending out from the section B at points at right angles to the pivotal connection of the ring and the section A; and arms extending up from said brackets and pivotally connected to the ring, substantially as described.

5. In a joint for suction or discharge pipes for dredgers and the like, the combination of a socket section A provided with a packing substantially at its outer end; a ball section working within said section A and over the packing; a ring H encircling said parts; bolts G extending loosely through said ring and connected to the section A; brackets I extending out from the section B; and arms J secured to the bracket and pivotally connected at their opposite end to the ring, substantially as described.

6. In a joint for suction or discharge pipes for dredgers and the like, the combination of a socket section A; a ball section working therein; a ring H encircling said parts at a slight distance therefrom, said ring being provided with two oppositely-disposed openings; bolts or screws passing through said openings and connected to the upper section; brackets I extending out from section B; and arms K secured to said brackets and pivotally connected to the ring H at points at right angles to the openings formed in the ring, substantially as described.

7. In a ball-and-socket joint of the class described, a socket member, in combination with a ball member seated therein; a ring or yoke mounted for oscillation upon said socket member and provided with projecting trunnions, the axis of which substantially includes the center of said ball member; and a yoke upon said ball member pivoted upon said trunnions, substantially as described.

8. A ball-and-socket joint of the class described, comprising a socket member, in combination with a ball member; a yoke upon said ball member; suitable packing; a ring pivoted upon said socket member; and trunnions upon said ring to engage said yoke, substantially as described.

9. In a ball-and-socket joint of the class described, a socket member provided with trunnions upon its sides, the axis of said trunnions including the center of the socket in said member; a ring or yoke pivoted upon said trunnions and provided with projecting trunnions at right angles thereto; a ball member seated within said socket member; and a yoke upon said ball member, pivoted upon the trunnions of said ring, substantially as described.

10. In a ball-and-socket joint of the class described, a socket member provided with trunnions upon its sides, in combination with a ring mounted upon said trunnions and provided with other trunnions at right angles thereto; a ball member seated within said socket member; and arms connected with the ball member and extending from said ball member into engagement with the trunnions upon said rings, substantially as described.

11. In a ball-and-socket joint of the class described, a socket member, in combination with a ring pivoted upon said socket member to swing upon an axis coincident with the center of said socket member; a ball member; and a yoke upon said ball member and having its arms pivoted upon trunnions provided upon said ring and at right angles to the axis of said ring, substantially as described.

12. In a ball-and-socket joint of the class described, a substantially spherical socket member having a ball-socket, in combination with a ball member in said socket; a ring or yoke pivoted upon said socket member; and an adjustable yoke provided on said ball member connected with said ring at right angles to the axis of said ring, substantially as described.

In testimony whereof I have signed my name to this specification in the presence of two subscribing witnesses.

LINDON W. BATES.

Witnesses:
PERCY E. MATTOCKS,
EDMUND S. SNEWIN.